US011919300B2

(12) United States Patent
Kawafuji et al.

(10) Patent No.: US 11,919,300 B2
(45) Date of Patent: Mar. 5, 2024

(54) INKJET PRINTING APPARATUS AND INKJET PRINTING METHOD

(71) Applicant: CANON KABUSHIKI KAISHA, Tokyo (JP)

(72) Inventors: Hiroshi Kawafuji, Kanagawa (JP); Kazuhiko Sato, Tokyo (JP); Kazuo Suzuki, Kanagawa (JP); Takeshi Murase, Kanagawa (JP); Hiroshi Taira, Tokyo (JP); Tomoki Yamamuro, Kanagawa (JP); Sae Mogi, Kanagawa (JP); Masaki Nitta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/201,034

(22) Filed: Mar. 15, 2021

(65) Prior Publication Data

US 2021/0300031 A1 Sep. 30, 2021

(30) Foreign Application Priority Data

Mar. 26, 2020 (JP) ............................. JP2020-056273

(51) Int. Cl.
*B41J 2/045* (2006.01)
*B41J 25/00* (2006.01)

(52) U.S. Cl.
CPC ......... *B41J 2/04563* (2013.01); *B41J 2/0458* (2013.01); *B41J 25/006* (2013.01)

(58) Field of Classification Search
CPC ...... B41J 2/04563; B41J 2/0458; B41J 2/175; B41J 25/006; B41J 2/04586; B41J 2/072; B41J 2/355; B41J 19/202; B41J 2/04528; B41J 2/04596; B41J 2/04551; B41J 2/04588
See application file for complete search history.

(56) References Cited

U.S. PATENT DOCUMENTS 5,311,214 A 5/1994 Hirasawa et al.
5,477,246 A 12/1995 Hirabayashi
5,887,991 A 3/1999 Narita et al.
(Continued)

FOREIGN PATENT DOCUMENTS

JP H05-057904 A 3/1993
JP H10-016228 A 1/1998
(Continued)

OTHER PUBLICATIONS

Jan. 9, 2024 Japanese Official Action in Japanese Patent Appln. No. 2020-056273.

*Primary Examiner* — Jannelle M Lebron
(74) *Attorney, Agent, or Firm* — Venable LLP

(57) ABSTRACT

An inkjet printing apparatus adopting short pulse heating is designed to output a uniform image without unevenness. To this end, in a serial inkjet printing apparatus, a print head is subjected to a short pulse heating treatment before each print scan is carried out. In a case where a print medium is a first print medium, the print head is heated to a first target temperature before carrying out each of the print scans. In a case where the print medium is a second print medium, the print head is heated to a second target temperature lower than the first target temperature before carrying out each of the print scans.

18 Claims, 15 Drawing Sheets

(56) References Cited

U.S. PATENT DOCUMENTS

| | | | |
|---|---|---|---|
| 5,895,155 | A | 4/1999 | Narita et al. |
| 6,007,174 | A | 12/1999 | Hirabayashi |
| 6,149,264 | A | 11/2000 | Hirabayashi |
| 6,196,655 | B1 | 3/2001 | Hirasawa et al. |
| 6,227,641 | B1 | 5/2001 | Nishikori et al. |
| 6,234,606 | B1 | 5/2001 | Suzuki |
| 6,286,926 | B1 | 9/2001 | Hirabayashi |
| 6,398,333 | B1 | 6/2002 | Mulay |
| 6,957,880 | B2 | 10/2005 | Kawatoko |
| 6,986,824 | B2 | 1/2006 | Suzuki et al. |
| 7,044,592 | B2 | 5/2006 | Sato et al. |
| 7,347,519 | B2 | 3/2008 | Nagamura et al. |
| 7,367,643 | B2 | 5/2008 | Furuichi et al. |
| 7,396,098 | B2 | 7/2008 | Kanematsu et al. |
| 7,517,044 | B2 | 4/2009 | Suzuki et al. |
| 7,775,622 | B2 | 8/2010 | Suzuki et al. |
| 7,798,593 | B2 | 9/2010 | Nitta et al. |
| 8,231,216 | B2 | 7/2012 | Yamamuro et al. |
| 8,240,802 | B2 | 8/2012 | Nakano et al. |
| 8,366,230 | B2 | 2/2013 | Taira et al. |
| 8,371,673 | B2 | 2/2013 | Maru et al. |
| 8,444,246 | B2 | 5/2013 | Muro et al. |
| 8,469,484 | B2 | 6/2013 | Jogo et al. |
| 8,613,492 | B2 | 12/2013 | Suzuki et al. |
| 8,628,163 | B2 | 1/2014 | Kanematsu et al. |
| 8,651,614 | B2 | 2/2014 | Sakamoto et al. |
| 8,651,616 | B2 | 2/2014 | Maru et al. |
| 8,675,250 | B2 | 3/2014 | Muro et al. |
| 8,702,192 | B2 | 4/2014 | Danzuka et al. |
| 8,740,333 | B2 | 6/2014 | Teshigawara et al. |
| 8,757,754 | B2 | 6/2014 | Azuma et al. |
| 8,783,832 | B2 | 7/2014 | Oonuki et al. |
| 8,864,266 | B2 | 10/2014 | Suzuki et al. |
| 8,888,223 | B2 | 11/2014 | Oonuki et al. |
| 8,931,869 | B2 | 1/2015 | Kawafuji |
| 8,931,875 | B2 | 1/2015 | Kosaka et al. |
| 8,950,843 | B2 | 2/2015 | Oikawa et al. |
| 8,979,238 | B2 | 3/2015 | Nishikori et al. |
| 9,016,821 | B2 | 4/2015 | Masuda et al. |
| 9,028,029 | B2 | 5/2015 | Azuma et al. |
| 9,033,471 | B2 | 5/2015 | Oonuki et al. |
| 9,039,112 | B2 | 5/2015 | Murayama et al. |
| 9,079,421 | B2 | 7/2015 | Kato et al. |
| 9,108,403 | B2 | 8/2015 | Kawatoko et al. |
| 9,108,409 | B2 | 8/2015 | Suzuki et al. |
| 9,114,607 | B2 | 8/2015 | Ishii et al. |
| 9,126,403 | B2 | 9/2015 | Ojiro et al. |
| 9,138,991 | B2 | 9/2015 | Murase et al. |
| 9,545,791 | B2 | 1/2017 | Donuki et al. |
| 9,656,459 | B2 | 5/2017 | Kuwabara et al. |
| 10,223,624 | B2 | 3/2019 | Yamamuro et al. |
| 10,668,717 | B2 | 6/2020 | Azuma et al. |
| 10,755,151 | B2 | 8/2020 | Ishii et al. |
| 2003/0025748 | A1 | 2/2003 | Kawatoko |
| 2009/0021548 | A1 | 1/2009 | Suzuki et al. |
| 2011/0032296 | A1 | 2/2011 | Nakano et al. |
| 2011/0085003 | A1* | 4/2011 | Oonuki ................ B41J 2/04563 347/17 |
| 2012/0050364 | A1 | 3/2012 | Honda et al. |
| 2012/0274951 | A1 | 11/2012 | Nishikori et al. |
| 2013/0027459 | A1* | 1/2013 | Wada ..................... B41J 11/002 347/16 |
| 2017/0297344 | A1 | 10/2017 | Ibe et al. |
| 2019/0009546 | A1 | 1/2019 | Sakamoto et al. |
| 2019/0009594 | A1 | 1/2019 | Sakamoto et al. |
| 2020/0047492 | A1 | 2/2020 | Umezawa et al. |
| 2020/0290367 | A1 | 9/2020 | Kawafuji |
| 2020/0307283 | A1 | 10/2020 | Nishioka et al. |
| 2021/0060982 | A1 | 3/2021 | Genta et al. |

FOREIGN PATENT DOCUMENTS

| | | | |
|---|---|---|---|
| JP | 2003-039642 | A | 2/2003 |
| JP | 2004-160685 | A | 6/2004 |
| JP | 2008-230161 | A | 10/2008 |
| JP | 2013-215951 | A | 10/2013 |
| JP | 2014-104621 | A | 6/2014 |
| JP | 2016-020028 | A | 2/2016 |
| JP | 2020-019858 | A | 2/2020 |

* cited by examiner

EJECTION PULSE: P1

TEMPERATURE ADJUSTMENT PULSE: P2

TEMPERATURE ADJUSTMENT PULSE P2'

| | PARAMETERS | |
|---|---|---|
| EJECTION PULSEP1 | Pop | EJECTION PULSE WIDTH Pop > Pth |
| | Vop | EJECTION VOLTAGE |
| | T | EJECTION PULSE APPLICATION CYCLE |
| TEMPERATURE ADJUSTMENT PULSE P2 | Ph | TEMPERATURE ADJUSTMENT PULSE WIDTH Ph < Pth |
| | Vh | TEMPERATURE ADJUSTMENT PULSE VOLTAGE |
| | T | TEMPERATURE ADJUSTMENT PULSE APPLICATION CYCLE |
| | Nh | NUMBER OF TIMES OF TEMPERATURE ADJUSTMENT PULSE APPLICATION Nh < (Th/T) |
| TEMPERATURE ADJUSTMENT PULSE P2' | Ph' | TEMPERATURE ADJUSTMENT PULSE WIDTH Ph' > Ph |
| | Vh' | TEMPERATURE ADJUSTMENT PULSE VOLTAGE (Th' > Vh) |
| | T' | TEMPERATURE ADJUSTMENT PULSE APPLICATION CYCLE T' < T |
| | Nh' | NUMBER OF TIMES OF TEMPERATURE ADJUSTMENT PULSE APPLICATION Nh' < (Th/T') |

FIG.6

| PRINT MEDIUM TYPE | FIRST TARGET TEMPERATURE T1 | SECOND TARGET TEMPERATURE T2 | BK INK USED | LOWER LIMIT TEMPERATURE ENABLING STABLE DISCHARGE |
|---|---|---|---|---|
| PLAIN PAPER | 25°C | 25°C | MATTE BK | 20°C |
| COATED PAPER | 25°C | 25°C | MATTE BK | 20°C |
| GLOSSY PAPER | 25°C | 20°C | PHOTO BK | 15°C |

FIG.10

| PRINT MEDIUM TYPE | TARGET TEMPERATURE T3 | C_loopMax | TEMPERATURE ADJUSTMENT PULSE WIDTH Ph | TEMPERATURE ADJUSTMENT PULSE DRIVING CYCLE T | NUMBER OF TIMES OF ADJUSTMENT PULSE APPLICATION Nh | TEMPERATURE ADJUSTMENT PULSE VOLTAGE Vh |
|---|---|---|---|---|---|---|
| PLAIN PAPER | 25°C | 6 | 0.1(μs) | 100(μs) | 5000 (TIMES) | 20 (V) |
| COATED PAPER | 25°C | 6 | 0.1(μs) | 100(μs) | 5000 (TIMES) | 20 (V) |
| GLOSSY PAPER | 25°C | 1 | 0.1(μs) | 100(μs) | 5000 (TIMES) | 20 (V) |

FIG.13

| PRINT MEDIUM TYPE | TARGET TEMPERATURE T3 | C_loopMax | TEMPERATURE ADJUSTMENT PULSE WIDTH Ph | TEMPERATURE ADJUSTMENT PULSE DRIVING CYCLE T | NUMBER OF TIMES OF ADJUSTMENT PULSE APPLICATION Nh | TEMPERATURE ADJUSTMENT PULSE VOLTAGE Vh |
|---|---|---|---|---|---|---|
| GLOSSY PAPER | 25°C | 1 | 0.1(μs) | 100(μs) | 5000 (TIMES) | 20 (V) |
| GLOSSY PAPER (IN CASE OF NOT REACHING TARGET TEMPERATURE) | 25°C | 1 | 0.2(μs) | 100(μs) | 5000 (TIMES) | 20 (V) |

FIG.14

INKJET PRINTING APPARATUS AND INKJET PRINTING METHOD

BACKGROUND OF THE INVENTION

Field of the Invention

The present invention relates to an inkjet printing apparatus and an inkjet printing method.

Description of the Related Art

In an inkjet printing apparatus, each of viscosity and surface tension of an ink needs to be adjusted in an appropriate range in order to maintain a favorable state of ejection. Moreover, physical properties of the ink such as the viscosity and the surface tension mentioned above are known to be variable depending on the temperature of the ink. For example, an amount of ejection of the ink has a substantially linear relation with the ink temperature. Specifically, the amount of ejection becomes larger as the ink temperature is higher while the amount of ejection becomes smaller as the ink temperature is lower. In short, it is required to adjust the ink temperature within an appropriate range in order to stably ejection of a predetermined amount of the ink.

Japanese Patent Laid-Open No. H 10-16228 discloses a method of adjusting an ink temperature in a thermal inkjet printing apparatus configured to ejection an ink in the form of droplets by applying a voltage to an ejection heater, in which the ink is heated by applying a short pulse to the ejection heater which is short enough not to cause ejection. In the following description, a treatment of adjusting the temperature of the ink by applying the pulse short enough for not causing ejection will be referred to as a short pulse heating treatment in this specification. The short pulse heating treatment can be carried at a timing to receive a print job or at a timing to start a print operation for each page. Meanwhile, in a serial inkjet printing apparatus, the short pulse heating treatment may be carried out at every print scan when appropriate.

In the case of carrying out the short pulse heating treatment at every print scan, each print scan is started at a timing of a head temperature reaching a target temperature. In other words, a required time period of each short pulse heating treatment may vary depending on the print scans. However, an image to be outputted may cause unevenness in the case where the above-mentioned short pulse heating treatment is used in conjunction with multipass printing.

Here, the multipass printing is a printing method of finishing an image in a unit region on a print medium by conducting several times of print scans with a print head. Moreover, in the multipass printing, elapsed time periods between multiple print scans may affect glossiness and a chromogenic property of the image. As a consequence, depending on the types of the print medium and of the ink, the outputted image may cause unevenness if the short pulse heating treatment is used in conjunction with the multipass printing.

SUMMARY OF THE INVENTION

The present invention has been made to solve the aforementioned program, and an object thereof is to output a uniform image without unevenness by using an inkjet printing apparatus adopting short pulse heating.

In a first aspect of the present invention, there is provided an inkjet printing apparatus comprising: a print scanning unit configured to carry out a print scan on a print medium by causing a print head that ejects an ink in accordance with print data to scan in a main scanning direction; a conveying unit configured to perform conveyance of the print medium in a direction crossing the main scanning direction; a heating unit configured to heat the print head before carrying out each of the print scans; and a controlling unit configured to control the print scanning unit, the conveying unit, and the heating unit, the ink jet printing apparatus being configured to print an image on the print medium by alternately carrying out the print scan by using the print scanning unit and the conveyance by using the conveying unit, wherein in a case where the print medium is a first print medium, the controlling unit heats the print head to a first target temperature before carrying out each of the print scans, and in a case where the print medium is a second print medium, the controlling unit heats the print head to a second target temperature lower than the first target temperature before carrying out each of the print scans.

In a second aspect of the present invention, there is provided an inkjet printing apparatus comprising: a print scanning unit configured to carry out a print scan on a print medium by causing a print head that ejects an ink in accordance with print data to scan in a main scanning direction; a conveying unit configured to perform conveyance of the print medium in a direction crossing the main scanning direction; a heating unit configured to heat the print head before carrying out each of the print scans; and a controlling unit configured to control the print scanning unit, the conveying unit, and the heating unit, the ink jet printing apparatus being configured to print an image on the print medium by alternately carrying out the print scan by using the print scanning unit and the conveyance by using the conveying unit, wherein the controlling unit heats the print head to a first target temperature before carrying out the first print scan on the print medium, and heats the print head to a second target temperature before carrying out each of the second and later print scans on the print medium, and wherein the first target temperature is equal to the second target temperature in a case where the print medium is a first print medium, and the first target temperature is higher than the second target temperature in a case where the print medium is a second print medium.

In a third aspect of the present invention, there is provided an inkjet printing apparatus comprising: a print scanning unit configured to carry out a print scan on a print medium by causing a print head that ejects an ink in accordance with print data to scan in a main scanning direction; a conveying unit configured to perform conveyance of the print medium in a direction crossing the main scanning direction; a heating unit configured to heat the print head before carrying out each of the print scans; and a controlling unit configured to control the print scanning unit, the conveying unit, and the heating unit, the ink jet printing apparatus being configured to print an image on the print medium by alternately carrying out the print scan by using the print scanning unit and the conveyance by using the conveying unit, wherein the controlling unit heats the print head to approach or reach a predetermined temperature as a target within a range of first limited time before carrying out each of the print scans in a case where the print medium is a first print medium, and the controlling unit heats the print head to approach or reach the predetermined temperature as the target within a range of second limited time shorter than the first limited time before carrying out each of the print scans in a case where the print medium is a second print medium.

In a fourth aspect of the present invention, there is provided an inkjet printing apparatus comprising: a print scanning unit configured to carry out a print scan on a print medium by causing a print head that ejects an ink in accordance with print data to scan in a main scanning direction; a conveying unit configured to perform conveyance of the print medium in a direction crossing the main scanning direction; a heating unit configured to heat the print head before carrying out each of the print scans; and a controlling unit configured to control the print scanning unit, the conveying unit, and the heating unit, the ink jet printing apparatus being configured to print an image on the print medium by alternately carrying out the print scan by using the print scanning unit and the conveyance by using the conveying unit, wherein the controlling unit heats the print head to a first target temperature before carrying out each the print scan in a case where the ink is a first ink, and the controlling unit heats the print head to a second target temperature lower than the first target temperature before carrying out each of the print scans in a case where the ink is a second ink.

In a fifth aspect of the present invention, there is provided an inkjet printing apparatus comprising: a print scanning unit configured to carry out a print scan on a print medium by causing a print head that ejects an ink in accordance with print data to scan in a main scanning direction; a conveying unit configured to perform conveyance of the print medium in a direction crossing the main scanning direction; a heating unit configured to heat the print head before carrying out each of the print scans; and a controlling unit configured to control the print scanning unit, the conveying unit, and the heating unit, the ink jet printing apparatus being configured to print an image on the print medium by alternately carrying out the print scan by using the print scanning unit and the conveyance by using the conveying unit, wherein the controlling unit heats the print head to a first target temperature before carrying out the first print scan on the print medium, and heats the print head to a second target temperature before carrying out each of the second and later print scans on the print medium, wherein the first target temperature is equal to the second target temperature in a case where the ink is a first ink, and the first target temperature is higher than the second target temperature in a case where the ink is a second ink.

In a sixth aspect of the present invention, there is provided an inkjet printing apparatus comprising: a print scanning unit configured to carry out a print scan on a print medium by causing a print head that ejects an ink in accordance with print data to scan in a main scanning direction; a conveying unit configured to perform conveyance of the print medium in a direction crossing the main scanning direction; a heating unit configured to heat the print head before carrying out each of the print scans; and a controlling unit configured to control the print scanning unit, the conveying unit, and the heating unit, the ink jet printing apparatus being configured to print an image on the print medium by alternately carrying out the print scan by using the print scanning unit and the conveyance by using the conveying unit, wherein the controlling unit heats the print head to approach or reach a predetermined temperature as a target within a range of first limited time before carrying out each of the print scans in a case where the ink is a first ink, and the controlling unit heats the print head to approach or reach the predetermined temperature as the target within a range of second limited time shorter than the first limited time before carrying out each of the print scans in a case where the ink is a second ink.

In a sixth aspect of the present invention, there is provided an inkjet printing method for printing an image on a print medium by alternately carrying out a print scan by causing a print head that ejects an ink onto the print medium in accordance with print data to scan in a main scanning direction, and a conveying operation to convey the print medium in a direction crossing the main scanning direction, wherein in a case where the print medium is a first print medium, the print head is heated to a first target temperature before carrying out each of the print scans, and in a case where the print medium is a second print medium, the print head is heated to a second target temperature lower than the first target temperature before carrying out each of the print scans.

In an eighth aspect of the present invention, there is provided an inkjet printing method for printing an image on a print medium by alternately carrying out a print scan by causing a print head that ejects an ink onto the print medium in accordance with print data to scan in a main scanning direction, and a conveying operation to convey the print medium in a direction crossing the main scanning direction, the inkjet printing method comprising: heating the print head to a first target temperature before carrying out the first print scan on the print medium and heating the print head to a second target temperature before carrying out each of the second and later print scans on the print medium, wherein the first target temperature is equal to the second target temperature in a case where the print medium is a first print medium, and the first target temperature is higher than the second target temperature in a case where the print medium is a second print medium.

In a ninth aspect of the present invention, there is provided an inkjet printing method for printing an image on a print medium by alternately carrying out a print scan by causing a print head that ejects an ink onto the print medium in accordance with print data to scan in a main scanning direction, and a conveying operation to convey the print medium in a direction crossing the main scanning direction, wherein the print head is heated to a predetermined temperature as a target within a range of first limited time before carrying out each of the print scans in a case where the print medium is a first print medium, and the print head is heated to the predetermined temperature as the target within a range of second limited time shorter than the first limited time before carrying out each of the print scans in a case where the print medium is a second print medium.

In a tenth aspect of the present invention, there is provided an inkjet printing method for printing an image on a print medium by alternately carrying out a print scan by causing a print head that ejects an ink onto the print medium in accordance with print data to scan in a main scanning direction, and a conveying operation to convey the print medium in a direction crossing the main scanning direction, wherein the print head is heated to a first target temperature before carrying out each the print scan in a case where the ink is a first ink, and the print head is heated to a second target temperature lower than the first target temperature before carrying out each of the print scans in a case where the ink is a second ink.

In a eleventh aspect of the present invention, there is provided an inkjet printing method for printing an image on a print medium by alternately carrying out a print scan by causing a print head that ejects an ink onto the print medium in accordance with print data to scan in a main scanning direction, and a conveying operation to convey the print medium in a direction crossing the main scanning direction, the inkjet printing method comprising: heating the print head to a first target temperature before carrying out the first print scan on the print medium and heating the print head to a second target temperature before carrying out each of the second and later print scans on the print medium, wherein the first target temperature is equal to the second target temperature in a case where the ink is a first ink, and the first target temperature is higher than the second target temperature in a case where the ink is a second ink.

In a twelfth aspect of the present invention, there is provided an inkjet printing method for printing an image on a print medium by alternately carrying out a print scan by causing a print head that ejects an ink onto the print medium in accordance with print data to scan in a main scanning direction, and a conveying operation to convey the print medium in a direction crossing the main scanning direction, wherein the print head is heated to a predetermined temperature as a target within a range of first limited time before carrying out each of the print scans in a case where the ink is a first ink, and the print head is heated to the predetermined temperature as the target within a range of second limited time shorter than the first limited time before carrying out each of the print scans in a case where the ink is a second ink.

Further features of the present invention will become apparent from the following description of exemplary embodiments with reference to the attached drawings.

BRIEF DESCRIPTION OF THE DRAWINGS

FIG. 6 is a table for explaining parameters of the respective pulses;

FIG. 10 is a table showing a first target temperature T1 and a second target temperature T2;

FIG. 13 is a table showing heating conditions;

FIG. 14 is a table showing examples of two types of temperature adjustment pulses prepared for glossy paper.

DESCRIPTION OF THE EMBODIMENTS

First Embodiment

Figure 1:
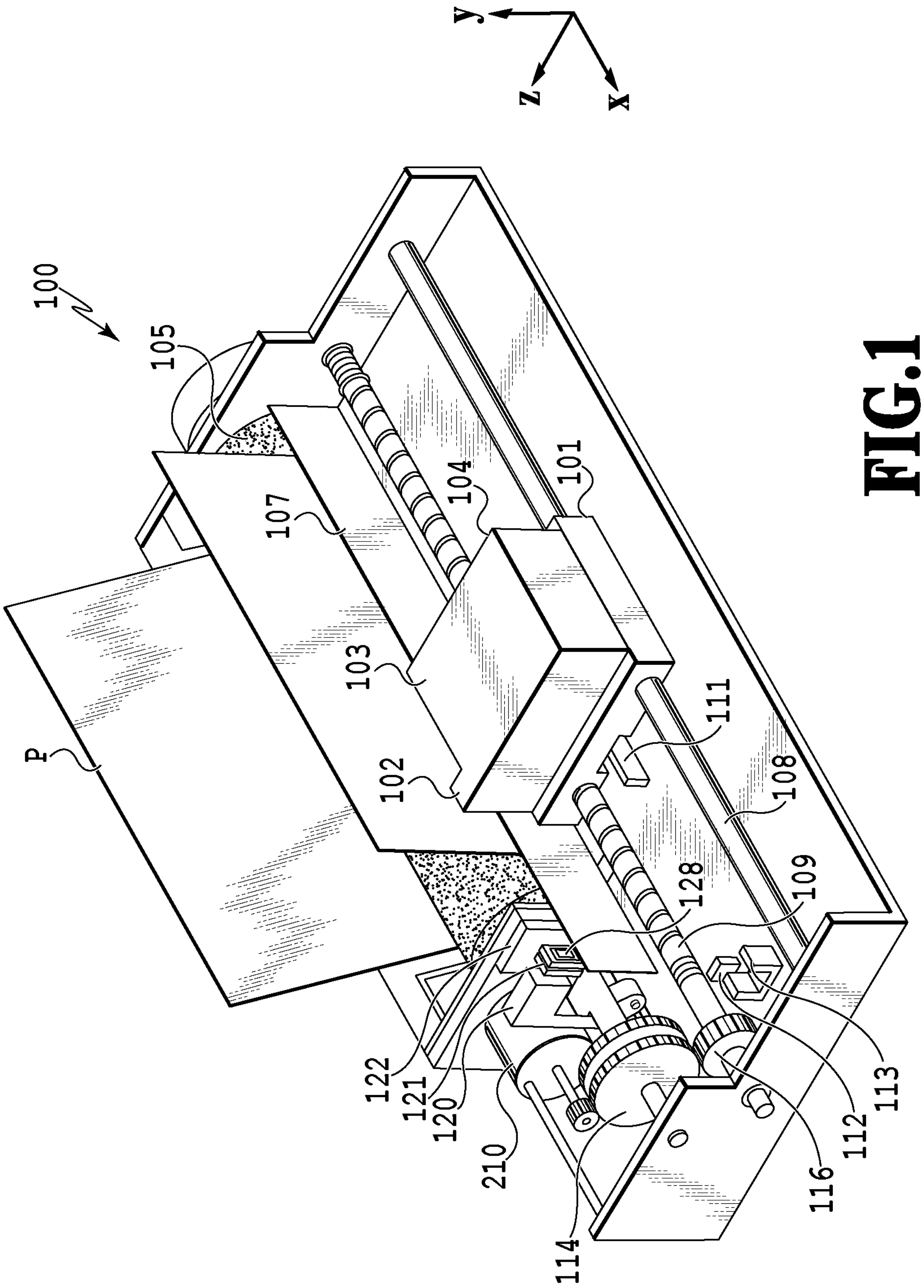
FIG. 1 is a schematic configuration diagram of an inkjet printing apparatus.

FIG. 1 is a schematic configuration diagram of an inkjet printing apparatus 100 (hereinafter also simply referred to as a printing apparatus 100) of this embodiment. Driving force of a carriage motor 210 is transmitted through drive transmission gears 114 to 116 so as to rotate a lead screw 109. A carriage 101 engaged with the lead screw 109 moves in ±x directions in FIG. 1 along with rotation of the lead screw 109. Specifically, the carriage 101 reciprocates in the ±x directions in FIG. 1, which represent a main scanning direction, in conjunction with forward rotation drive or reverse rotation drive of the carriage motor 210. A guide rail 108 supports the carriage 101 that reciprocates in the ±x directions from below.

A cartridge 104 formed by integrating an inkjet print head 102 with an ink tank 103 is detachably mounted on the carriage 101. An image corresponding to one band is printed on a print medium P by causing the print head 102 to eject an ink in accordance with print data while causing the carriage 101 to reciprocate in the ±x directions. A platen 105 and a sheet pressing plate 107 jointly keep a surface of the print medium P at the printing portion of the print head 102 so as to parallel to an ejection port surface of the print head 102. Once a print scan for the one band is performed by the print head 102, the print medium P is conveyed in a direction (which is +y direction in this embodiment) that crosses the x direction for a distance corresponding to the one band. The image is printed stepwise on the print medium P by alternately repeating the print scan by the print head 102 and the operation to convey the print medium P as described above.

An end portion in the +x direction of a scanning region of the carriage 101 is defined as a home position. A cleaning blade 122 for wiping the ejection port surface of the print head 102 and a cap 128 for capping the ejection port surface are arranged at the home position. In the case where the carriage 101 is located at the home position, a cap support 121 brings the cap 128 into contact with the ejection port surface. Thus, it is possible to suppress evaporation of the ink from the ejection port surface. In the meantime, it is possible to perform suction recovery processing on the print head by operating an aspirator 120 in the state of capping the ejection port surface.

In the case where the carriage 101 is located at the home position, photo couplers 112 and 113 detect a lever 111 fitted to the carriage 101. A result of detection by the photo couplers 112 and 113 is also used for switching a rotating direction of the carriage motor 210, and the like.

Figure 2:
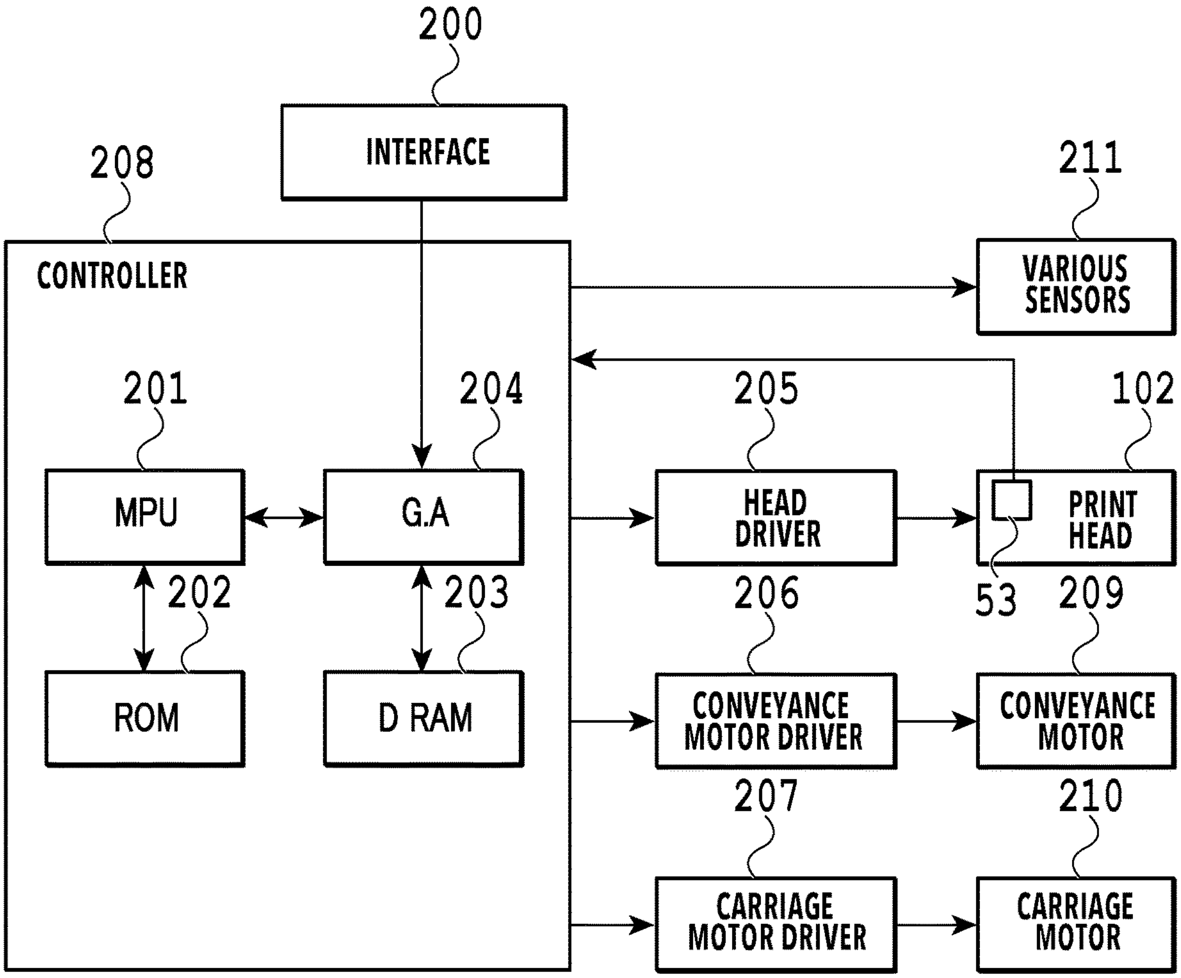
FIG. 2 is a block diagram for explaining a control configuration of the printing apparatus.

FIG. 2 is a block diagram for explaining a control configuration of the printing apparatus 100. A controller 208 includes an MPU 201, a ROM 202, a DRAM 203, and a gate array (G.A) 204. The MPU 201 controls the entire printing apparatus 100 in accordance with programs stored in the ROM 202 while using the DRAM 203 as a work area. The G.A 204 performs control to supply print data to the print head 102, and performs data transfer control among an interface 200, the MPU 201, and the DRAM 203.

A head driver 205 drives the print head 102 based on the print data supplied from the G.A 204. A conveyance motor driver 206 drives a conveyance motor 209 for conveying the print medium P under an instruction of the MPU 201. A carriage motor driver 207 drives the carriage motor 210 either in a forward direction or in a reverse direction under an instruction of the MPU 201.

Image data supplied from an externally connected host apparatus is inputted to the controller 208 through the interface 200. The MPU 201 subjects the received image data to prescribed processing in accordance with a program stored in the ROM 202, thereby creating print data printable with the print head 102. The MPU 201 drives the print head 102, the conveyance motor 209, and the carriage motor 210 in accordance with the created print data, thus controlling a print operation on the print medium P.

The print head 102 is provided with a temperature sensor 53 for detecting a temperature of the print head 102, and a detected value by the temperature sensor 53 is transmitted to the controller 208. Meanwhile, various sensors 211 include multiple sensors in addition to the photo couplers 112 and 113 described with reference to FIG. 1, and the sensors are arranged at various locations in the apparatus. The MPU 201 controls printing on the print medium P based on sensor detection values by using the temperature sensor 53 and the various sensors 211.

Here, a control program to be executed by the MPU 201 may be stored in an erasable and writable storage medium such as an EEPROM. Then, the control program stored in the EEPROM may be updated by the externally connected host apparatus.

Figure 3:
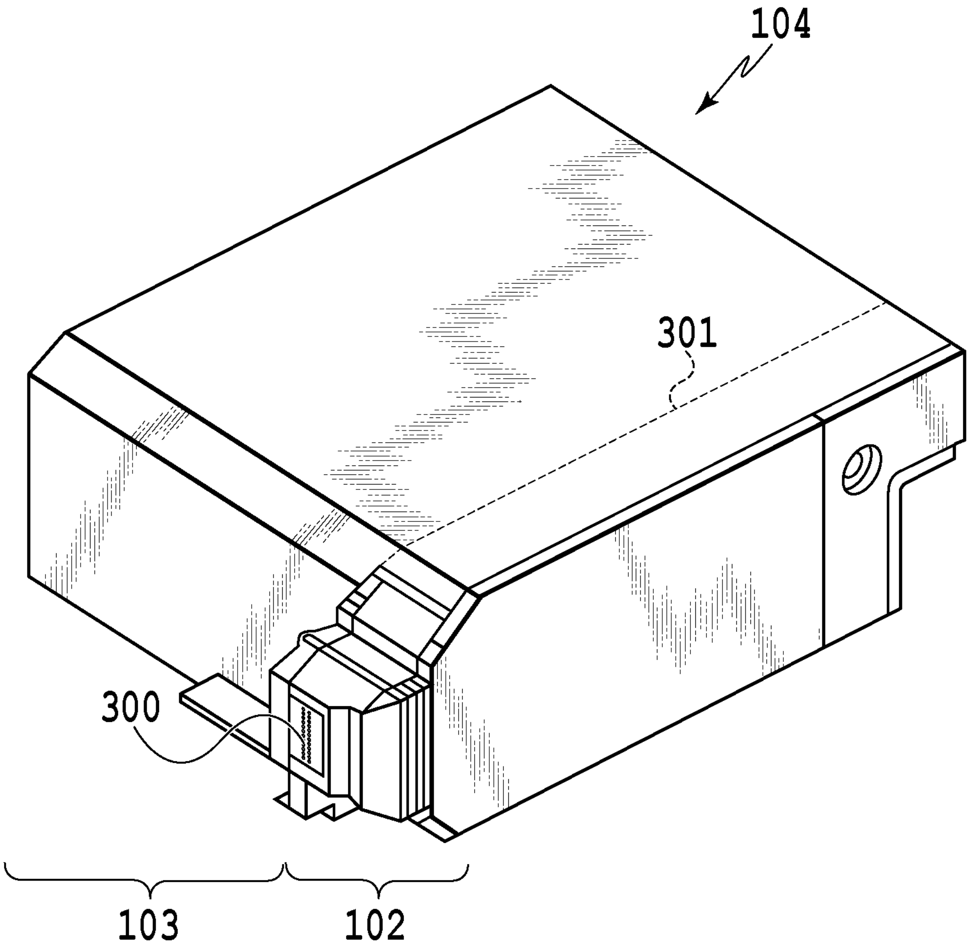
FIG. 3 is an external perspective view of a cartridge.

FIG. 3 is an external perspective view of the cartridge 104 used in this embodiment. The cartridge 104 of this embodiment is formed by integrating the print head 102 with the ink tank 103. A fibrous or porous ink absorber is housed in the ink tank 103 and an ink to be supplied to the print head 102 is held therein.

As the cartridge 104 is attached to the carriage 101, electrodes (not shown) arranged on a side surface of the cartridge 104 are electrically connected to a main body board (not shown) of the apparatus. Then, the ink is ejected from ejection port arrays 300 of the print head 102 in accordance with ejection signals that the electrodes receive from the main body board.

Although the example of the cartridge 104 formed by integrating the print head 102 with the ink tank 103 has been described above, the print head 102 and the ink tank 103 may be made separable at a boundary line 301, for example. In this case, if the ink in the ink tank 103 is used up, only the ink tank 103 may be replaced while keeping the print head 102 loaded on the carriage 101.

Figure 4:
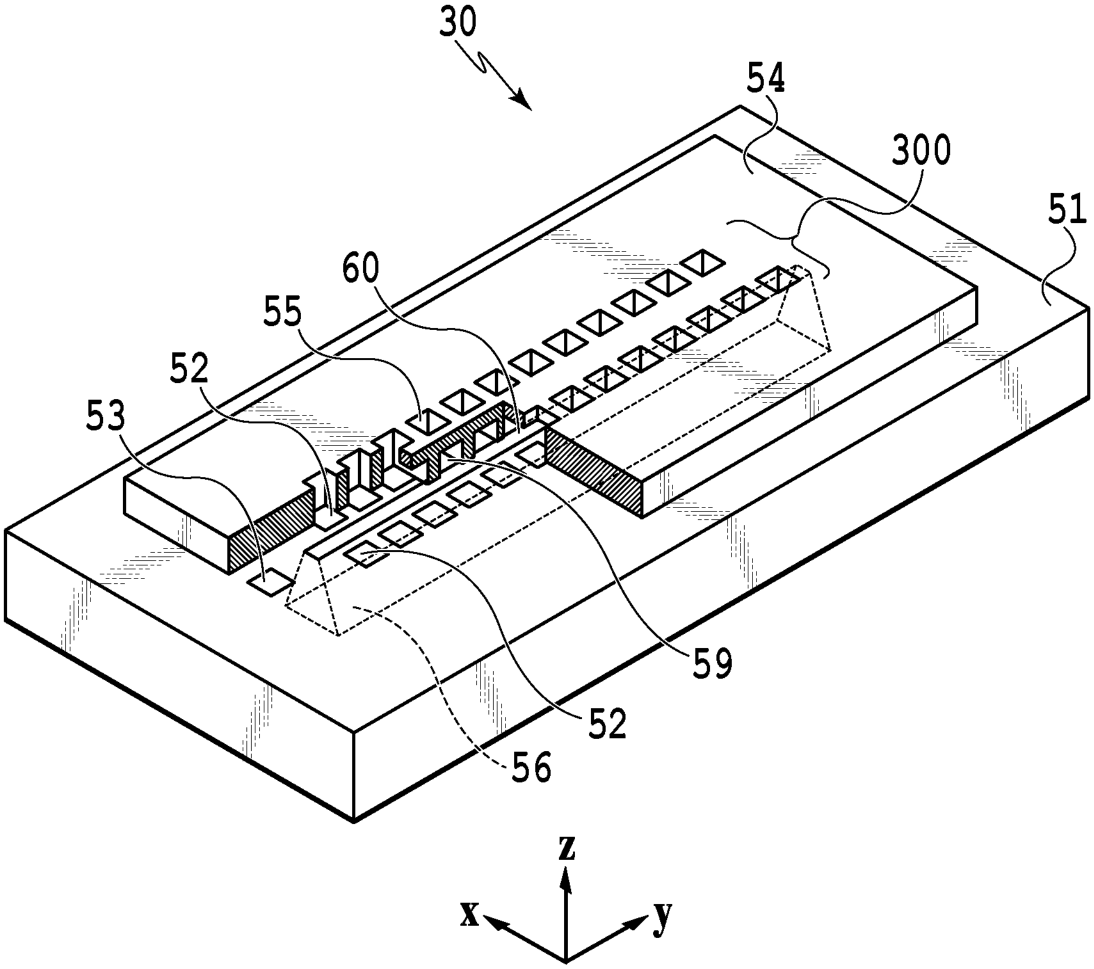
FIG. 4 is a diagram for explaining a configuration of an element board.

FIG. 4 is a diagram for explaining a configuration of an element board 30, which is a portion of the print head 102 configured to eject the ink. The element substrate 30 is formed mainly by stacking a flow passage member 54 on a substrate 51.

Heaters 52 serving as energy generation elements for ejecting the ink are arranged on the substrate 51 at a predetermined pitch in a y direction in FIG. 4. In this embodiment, the heaters arranged at a pitch of 600 dpi are arranged in two rows. An ink supply port 56 that extends in the y direction and penetrates in a z direction is provided between the two rows of the heaters 52. The ink supplied from the ink tank 103 is fed to the element board 30 through the ink supply port 56. The temperature sensor 53 for detecting the temperature of the print head 102 is arranged at an end portion on the substrate 51. A detected temperature by the temperature sensor 53 practically represents a temperature of the ink which is in contact with the temperature sensor 53.

Ejection ports 55 are provided in the flow passage member 54 at positions opposed to the respective heating resistance elements 52, thereby forming the ejection port arrays 300 arranged in the y direction. The two ejection port arrays 300 are arranged in a state of being displaced by a half pitch in the y direction so that this embodiment can print dots at printing resolution of 1200 dpi corresponding to this half pitch configuration. Meanwhile, the flow passage member 54 is provided with flow passages 59 communicating with the corresponding ejection ports 55, respectively, and a common liquid chamber 60 connected to the ink supply port 56 and connected to the flow passages 59 in common.

Under the configuration described above, the ink supplied from the ink supply port 56 to the common liquid chamber 60 is guided to the ejection ports 55 through the respective flow passages, thus forming menisci. Then, as a prescribed pulse voltage is applied to each heater 52 in accordance with an ejection signal, the ink in contact with the heater 52 causes film boiling and the ink in the form of a droplet is ejected in the z direction from the corresponding ejection port 55 by using growth energy of a generated bubble.

Figures 5A, 5B, 5C:
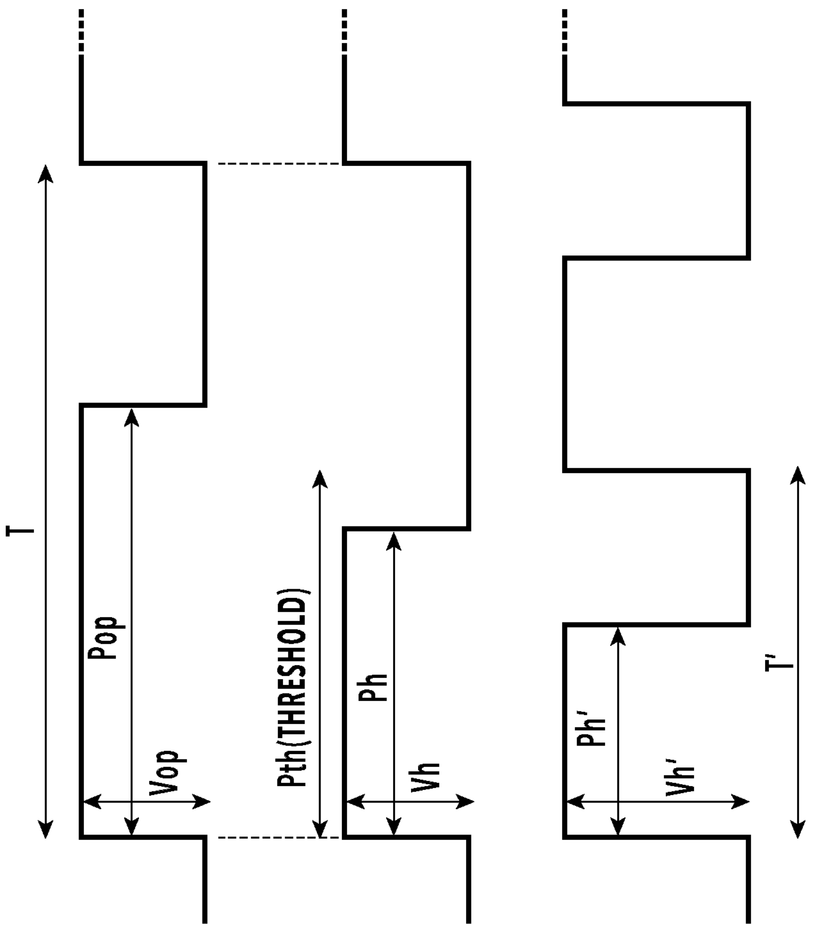
FIGS. 5A to 5C are diagrams showing types of voltage pulses to be applied to a heater.

FIGS. 5A to 5C are diagrams showing types of voltage pulses to be applied to each heater 52. Meanwhile, FIG. 6 is a table for explaining parameters of the respective pulses shown in FIGS. 5A to 5C.

FIG. 5A shows an ejection pulse P1. The ejection pulse P1 has a voltage Vop, a pulse width Pop, and a driving cycle T. The heater 52 to which the ejection pulse P1 is applied develops the film boiling in the ink and the ink is ejected from the corresponding ejection port 55.

FIG. 5B shows a first temperature adjustment pulse P2. The first temperature adjustment pulse P2 is a pulse used in a short pulse heating treatment and has a voltage Vh, a pulse width Ph, and the driving cycle T. The first temperature adjustment pulse P2 is a pulse for heating the ink to the extent not causing ejection. Accordingly, assuming that a lower limit value of the pulse width to effectuate a ejection operation is defined as Pth, then a relation $Ph<Pth<Pop$ holds true.

FIG. 5C shows a second temperature adjustment pulse P2'. The second temperature adjustment pulse P2' is a pulse secondarily used in the short pulse heating treatment and has a voltage Vh', a pulse width Ph', and a driving cycle T'. The second temperature adjustment pulse P2' has a higher voltage and a shorter cycle than the first temperature adjustment pulse P2 does.

Specifically, regarding the pulse width, the pulse voltage, and the pulse cycle, the following relations hold true among the three types of pulses shown in FIGS. 5A to 5C, namely, $Pop>Pth>Ph>Ph'$, $Vh<Vh'$, and $T>T'$. Note that these inequalities represent magnitude relations in a case where $Vop=Vh'$ holds true. However, the magnitude relation between Vop and Vh' is not limited to a particular relation. In the meantime, the driving cycle of the first temperature adjustment pulse P2 may be different from the driving cycle T of the ejection pulse.

In this embodiment, the short pulse heating treatment is carried out in each print scan. Specifically, the first temperature adjustment pulse P2 is applied to each of the heaters 52 in a state where the carriage 101 is at rest. Then, upon detection that the temperature detected by the temperature sensor 53 exceeds a threshold, a movement of the carriage 101 is started so as to carry out one print scan. During the conduct of the print scan, the ejection pulse P1 shown in FIG. 5A is applied to each of the heaters 52 in accordance with the corresponding ejection signal.

Note that codes Nh and Nh' in FIG. 6 denote the numbers of times of application of the first temperature adjustment pulse P2 and the second temperature adjustment pulse P2', respectively, in the case of carrying out the short pulse heating treatment. Assuming that time required for the short pulse heating treatment is Th, the numbers of times of application Nh and Nh' are expressed by $Nh=Th/T$ and $Nh'=Th/T'$, respectively.

Figure 7:
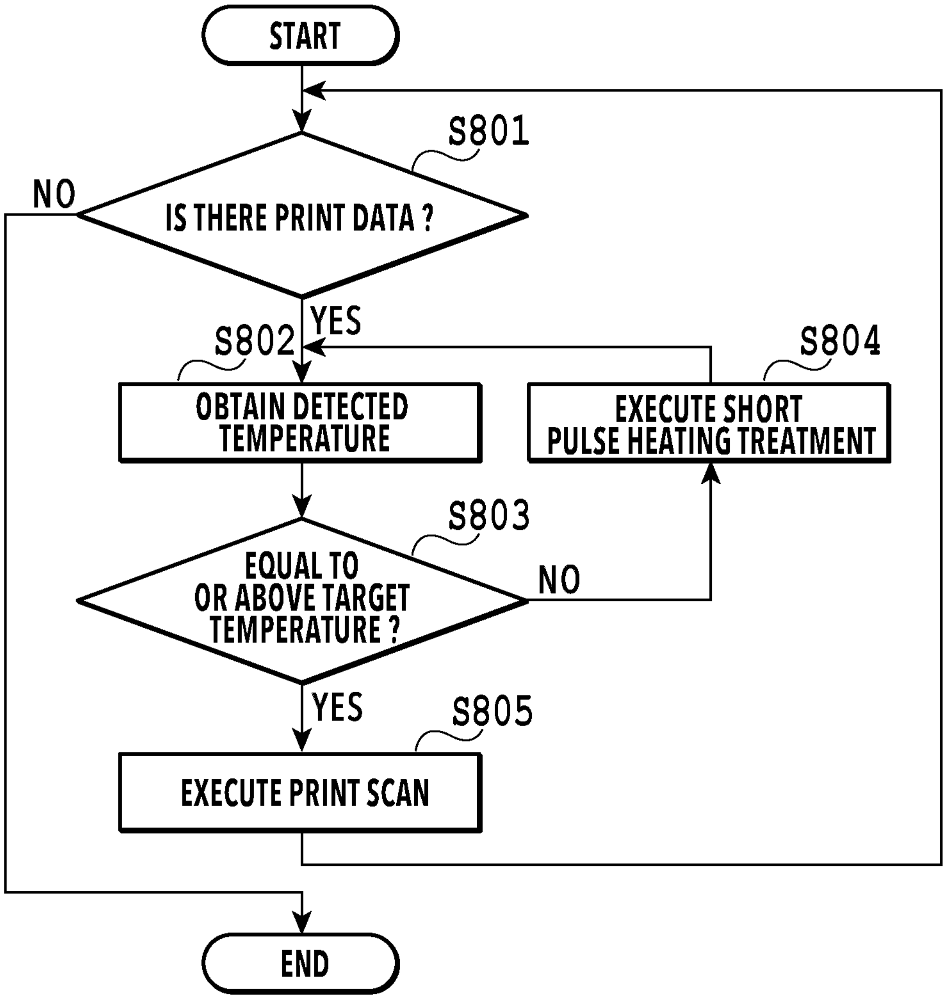
FIG. 7 is a flowchart for explaining a general print control method.

FIG. 7 is a flowchart for explaining a conventional general print control method applicable to a serial inkjet printing apparatus. This processing is started at the time of input of a print job to the printing apparatus 100.

At the start of the processing, the MPU 201 first determines in S801 whether or not there is print data for the next print scan. In a case where there is the print data for the next print scan, the MPU 201 proceeds to S802 and obtains the detected temperature by the temperature sensor 53.

In S803, the MPU 201 determines whether or not the detected temperature obtained in S802 is equal to or above a target temperature. In a case where the detected temperature is below the target temperature, the MPU 201 proceeds to S804 and executes a prescribed short pulse heating treatment. Specifically, the temperature adjustment pulse at the prescribed pulse width Ph, pulse voltage Vh, and the pulse cycle T is applied the predetermined number of times Nh.

The processing from S802 to S804 is repeated until the detected temperature is determined to be equal to or above the target temperature in S803. In the case where the detected temperature is determined to be equal to or above the target temperature in S803, the MPU 201 proceeds to S805 to execute one print scan, and then returns to S801.

The MPU 201 repeats the above-described processing from S801 to S805 until it is determined that there is no print data left in S801. Then, the processing is terminated in the case where the MPU 201 determines that there is no print data for the next print scan in S801.

In the above-described conventional short pulse heating control, the processing from S802 to S804 is repeated until the detected temperature is determined to be equal to or above the target temperature in S803. Accordingly, time elapsed from a point of the print scan in S805 to a point of the subsequent print scan in S805 varies depending on the detected temperature at each time. As a consequence, in a case where the above-described short pulse heating treatment control is carried out in multipass printing, such a variation in the elapsed time between the print scans to be sequentially performed as described above may be recognized as unevenness in an image.

Figure 8:
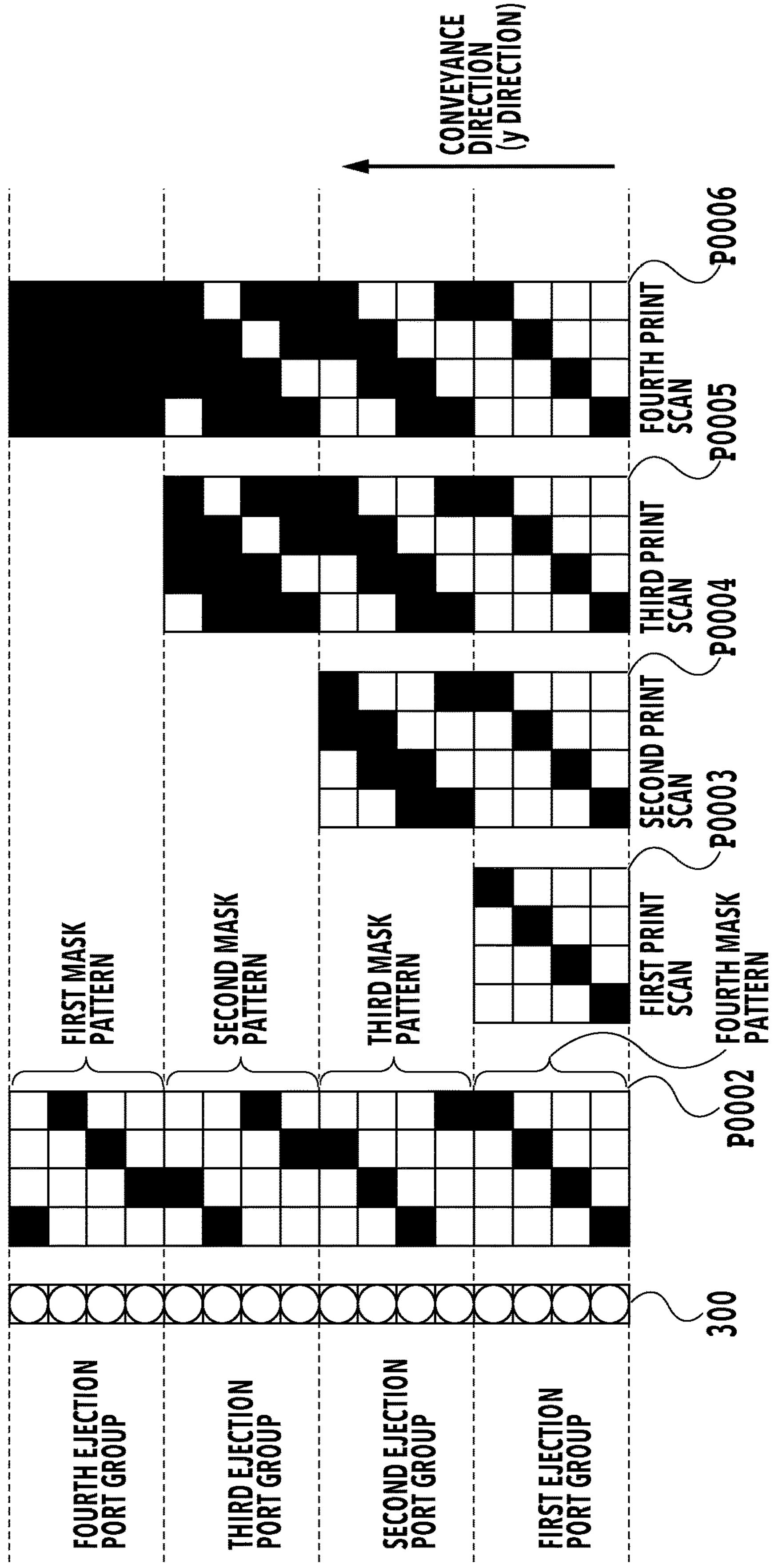
FIG. 8 is an explanatory diagram of multipass printing.

FIG. 8 is an explanatory diagram of the multipass printing. Here, a description will be given of an example of four-pass printing. Moreover, in order to simplify the explanation, sixteen ejection ports 55 configured to eject the ink of the same type are assumed to be arranged in a line in the ejection port array 300.

In the case of conducting the four-pass printing, the sixteen ejection ports 55 are divided into first to fourth ejection port groups each including four ejection ports. Then, first to fourth mask patterns are associated with the first to fourth ejection port groups, respectively. Each mask pattern has a region defined by four areas by four areas. Each area indicated with black represents an area where dot printing is allowed while each area indicated with white represents an area where the dot printing is not allowed, respectively. The first to fourth mask patterns have mutually complementary relations.

Patterns P0003 to P0006 indicated in association with first to fourth print scans illustrate how an image is finished on the print medium P in the case of performing four-pass print scanning in accordance with the first to fourth mask patterns. The print medium P is conveyed in a length corresponding to four pixels in the y direction every time the print scan is completed, and the image in a unit region of (the 4×4 pixel region) of the print medium is finished by the four times of print scans in accordance with the first to fourth mask patterns having the mutually complementary relations. By performing the above-described multipass printing, negative image effects attributed to variations in ejection performances of the respective nozzles and in conveyance accuracy of the print medium are scattered over the entire image so as to make the negative effects unnoticeable on the image.

In the above-described multipass printing, the ink having adhered to the unit region partially subjected to the print scan is exposed to the atmosphere until the next print scan takes place. Here, in the case of the print medium having a relatively low ink absorption property such as glossy paper, the ink having adhered thereto is dried during a period on and before the subsequent print scan whereby roughness may be formed on the image. Moreover, this roughness becomes more significant as the elapsed time between the print scans is longer, thus causing degradation of glossiness and deterioration in chromogenic property. In other words, there may be differences in glossiness and chromogenic property between a unit region where the required time for the short pulse heating treatment is relatively long and a unit region where the required time therefor is relatively short, and the differences may be recognized as unevenness on the image.

On the other hand, in the case of the print medium having a relatively high ink absorption property such as plain paper and coated paper, the ink is less likely to be left on a surface of the print medium and the roughness is less likely to be formed thereon. For this reason, the differences in glossiness and chromogenic property are less likely to occur between the unit regions even though there is the variation in elapsed time between the print scans attributed to the short pulse heating, and image unevenness is therefore less recognizable. In view of the above-mentioned circumstances, this embodiment is designed to adopt different short pulse heating control methods depending on the type of the print medium.

Figure 9:
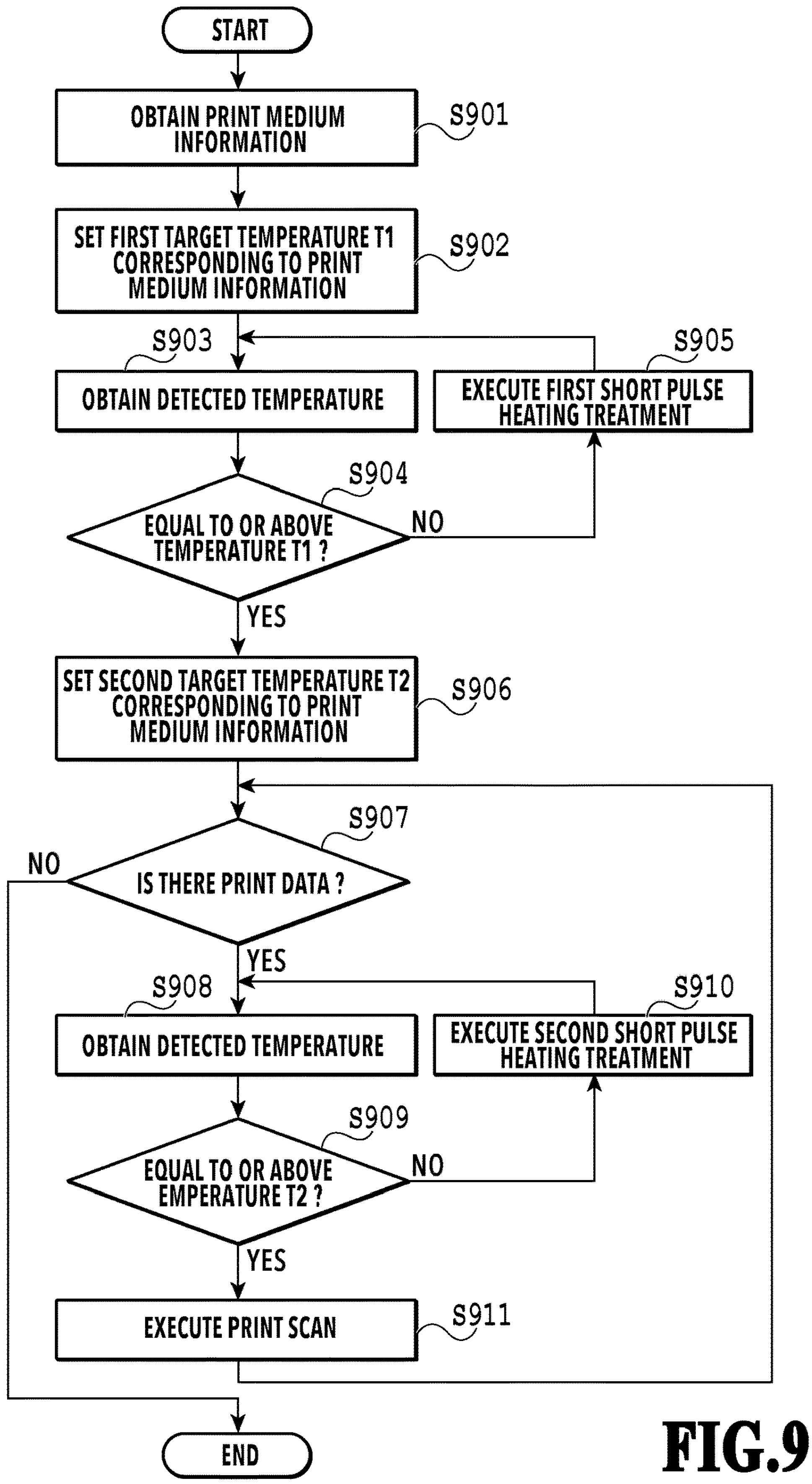
FIG. 9 is a flowchart for explaining a print control method of a first embodiment.

FIG. 9 is a flowchart for explaining the print control method of this embodiment. This processing is processing to be executed by the MPU 201 of FIG. 2 in accordance with the program stored in the ROM 202 while using the DRAM 203 as the work area in the case where the print job is inputted to the printing apparatus 100.

At the start of the processing, the MPU 201 first analyzes the received print job and obtains the type of the print medium P in S901. Next, in S902, the MPU 201 sets a first target temperature based on the type of the print medium obtained in S901. Here, the first target temperature represents a target temperature of the print head 102 required for starting the first print scan on the print medium.

In S903, the MPU 201 obtains the detected temperature by the temperature sensor 53. In S904, the MPU 201 determines whether or not the detected temperature is equal to or above a first target temperature T1 set in S902. In the case where the detected temperature is below the first target temperature T1, the MPU 201 proceeds to S905 and executes a first short pulse heating treatment. Specifically, the temperature adjustment pulse P2 is applied to each of the heaters 52 in accordance with the pulse width Ph, the pulse voltage Vh, the pulse cycle T, and the number of times of application Nh which are preset for the first short pulse heating treatment.

The above-described processing from S903 to S905 is repeated in a state where the print head 102 is stopped until the detected temperature is determined to be equal to or above the first target temperature T1 in S904. In the case where the detected temperature is determined to be equal to or above the first target temperature T1 in S904, the MPU 201 proceeds to S906.

In S906, the MPU 201 sets a second target temperature T2 based on the type of the print medium obtained in S901.

Here, the second target temperature T2 represents a target temperature of the print head 102 required for starting the second and later print scans.

In S907, the MPU 201 determines whether or not there is the print data for the next print scan. If there is the print data for the next print scan, the MPU 201 proceeds to S908 and obtains the detected temperature by the temperature sensor 53. In the subsequent S909, the MPU 201 determines whether or not the detected temperature is equal to or above the second target temperature T2 set in S906. In the case where the detected temperature is below the second target temperature T2, the MPU 201 proceeds to S910 and executes a second short pulse heating treatment. Specifically, the temperature adjustment pulse P2 is applied to each of the heaters 52 in accordance with the pulse width Ph, the pulse voltage Vh, the pulse cycle T, and the number of times of application Nh which are preset for the second short pulse heating treatment.

The above-described processing from S908 to S910 is repeated until the detected temperature is determined to be equal to or above the second target temperature T2 in S909. In the case where the detected temperature is determined to be equal to or above the second target temperature in S909, the MPU 201 proceeds to S911 to execute one print scan, and then returns to S907.

The MPU 201 repeats the processing from S907 to S911 until it is determined that there is no print data left in S907. Then, the processing is terminated in the case of the determination that there is no print data for the next print scan.

FIG. 10 is a table showing the first target temperature T1 obtained in S902 of FIG. 9 and the second target temperature T2 obtained in S906 thereof, which are associated with types of the print medium and types of the ink. This information is saved in the ROM 202 (see FIG. 2) in advance, and the MPU 201 performs setting of the target temperatures with reference to this information.

This embodiment assumes that the type of the ink to be used is also changed depending on the type of the print medium. To be more precise, a matte black ink (matte BK ink) which can print an image that has a high density and is excellent in sharpness is used for plain paper and coated paper. Meanwhile, a photo black ink (photo BK ink) which is excellent in gradation and makes graininess less noticeable is used for glossy paper. In the case where the print medium is glossy paper, for example, an image printed by using the photo BK ink can achieve higher glossiness than an image printed by using the matte BK ink.

Lower limit temperatures of the print head 102 which allow stable ejection in the case of using the respective inks are indicated on the right side of FIG. 10. In order for a stable ejection operation, the matte BK ink requires the temperature equal to or above 20° C. while the photo BK ink requires the temperature equal to or above 15° C. Here, the cartridges 104 for both the matte BK ink and the photo BK ink may be attached to the carriage 101 at the same time or the cartridge 104 to be attached may be changed by replacing the cartridges 104.

In this embodiment, the first target temperature T1 and the second target temperature T2 are set to such temperatures that secure sufficient margins with respect to the above-mentioned lower limit temperature. Accordingly, the temperature of the print head does not fall below the above-mentioned lower limit value during the print scan even in the case of printing a low duty image.

In this embodiment, the first target temperature T1 is fixed to 25° C. in the case of any of the plain paper, the coated paper, and the glossy paper. On the other hand, the second target temperature T2 is set to 25° C. in the case of the plain paper or the coated paper and is set to 20° C. being lower than the above-mentioned temperature in the case of the glossy paper. By setting the second target temperature T2 applicable to the glossy paper lower than the second target temperature T2 applicable to the plain paper or the coated paper, it is possible to shorten the required time for the second short pulse heating treatment in the case of printing on the glossy paper shorter than the required time in the case of printing on the plain paper or the coated paper. In other words, it is possible to suppress the roughness on the surface of the image as a consequence. Moreover, setting the first target temperature T1 higher than the second target temperature T2 also contributes to reduction in time of the second short pulse heating treatment. Because it is possible to delay a point of time that the temperature of the print head falls below the second target temperature in the subsequent print scan by setting the print head to a sufficiently high temperature at the time of the first print scan.

In other words, according to the short pulse heating control of this embodiment, it is possible to suppress the roughness on the surface of the entire image under the stable ejection operation even in the case of printing the image on the glossy paper, and thus to make the image unevenness attributed to the differences in glossiness and chromogenic property between the unit regions unnoticeable.

Figure 11A:
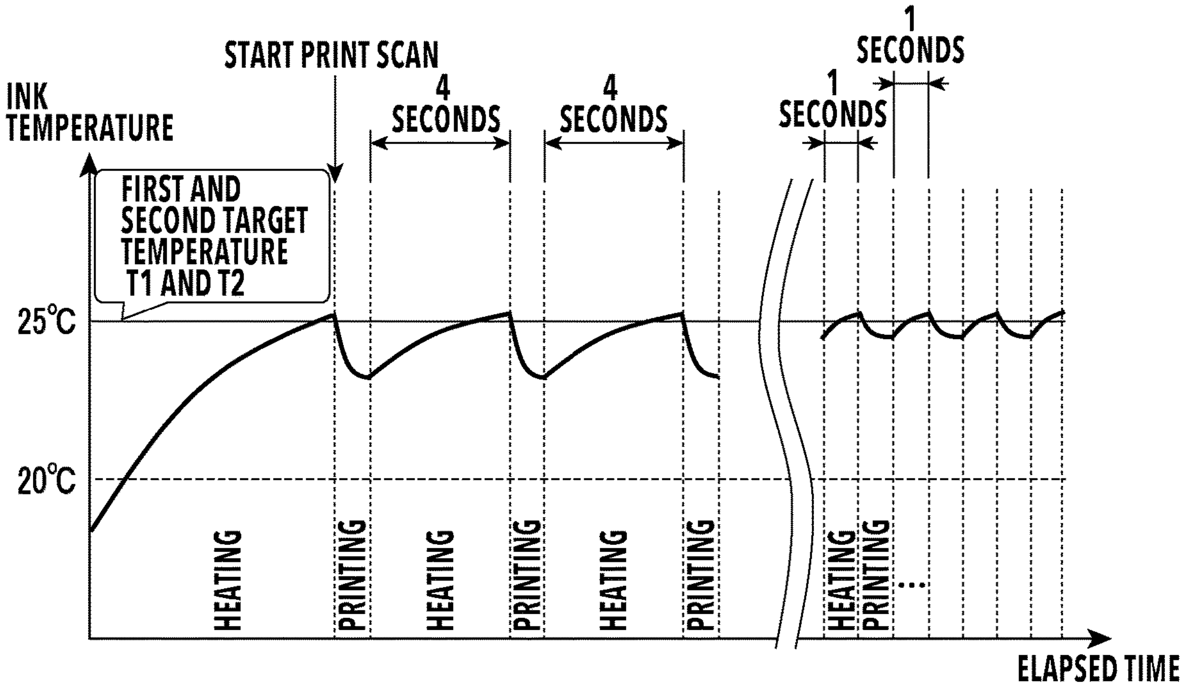
FIGS. 11A and 11B are graphs showing changes in detected temperature of a print head.
Figure 11B:
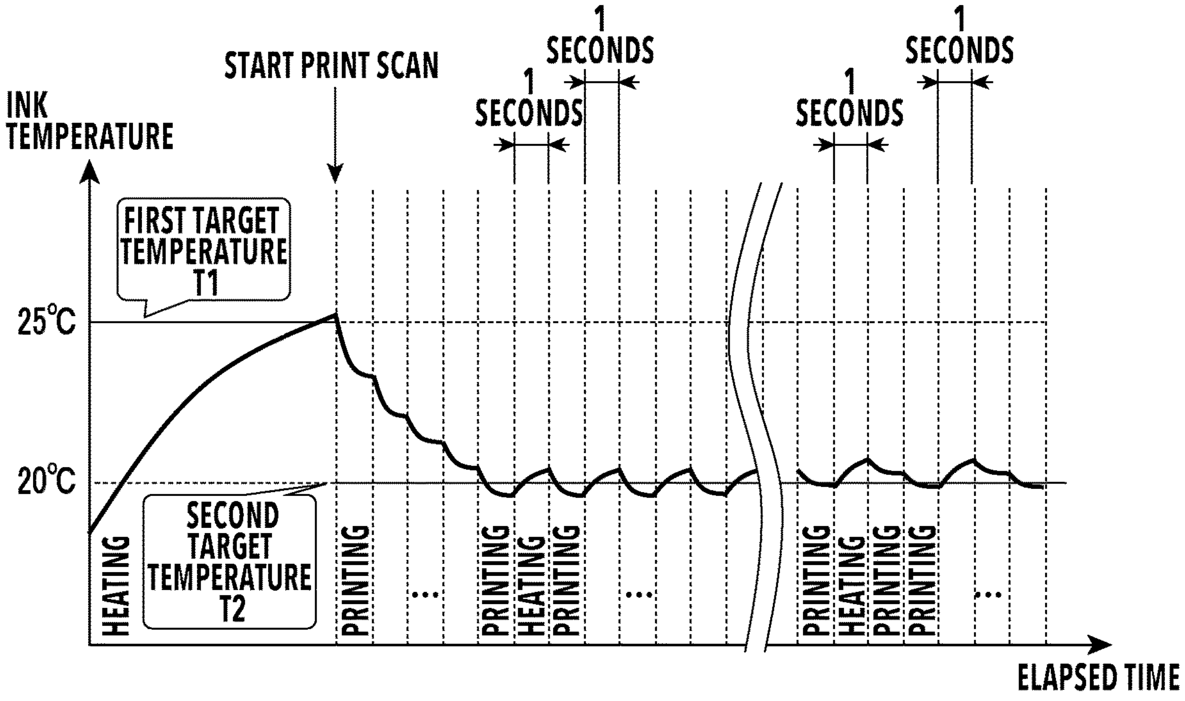

FIGS. 11A and 11B are graphs showing changes in detected temperature of the print head in the case of printing an image on the plain paper or the coated paper and in the case of printing an image on the glossy paper. Here, the graphs represent the case of printing a uniform image on the print medium while setting a surrounding environmental temperature to 15° C. and causing the print head to ejection the ink at a constant driving frequency. In these two graphs, the time required for one print scan is set to 1 second.

FIG. 11A shows the variation in temperature of the temperature sensor 53 in the case of performing the multipass printing according to the flowchart of FIG. 9 in a state of setting both the first target temperature T1 and the second target temperature T2 equal to 25° C. In the following, the above-mentioned printing mode will be referred to as a first printing mode. On the other hand, FIG. 11B shows the variation in temperature of the temperature sensor 53 in the case of performing the multipass printing according to the flowchart of FIG. 9 in a state of setting the first target temperature T1 equal to 25° C. and setting the second target temperature T2 equal to 20° C. In the following, the above-mentioned printing mode will be referred to as a second printing mode.

In any of the first printing mode and the second printing mode, the print head 102 is first heated to the first target temperature T1 (the routine from S903 to S905) at the start of the processing. Both of the modes take about the same length of time from the start of the processing to the point that the detected temperature reaches the first target temperature T1.

The first print scan is carried out in the case where the detected temperature reaches the first target temperature T1. Then, during the period of about 1 second to carry out this print scan, the temperature of the print head 102 changes to a value lower than the first target temperature T1.

The short pulse heating treatment is carried out again at the start of the second print scan (the routine from S908 to S910). Then, the second print scan is carried out in the case where the detected temperature is higher than the second target temperature T2. Here, in the first printing mode (see FIG. 11A) where the second target temperature T2 is set equal to 25° C., it takes 4 seconds for heating the print head to the second target temperature T2. Specifically, after the second print scan, the short pulse heating treatment for 4 seconds and the print scan for 1 second are alternately carried out in the first printing mode.

Thereafter, as the print scans are further repeated, the temperature of the entire print head 102 is increased, whereby the amount of drop in the temperature at each print scan is reduced and the time required for the second short pulse heating treatment also becomes less. As a consequence, the print head 102 transitions to a state of alternately carrying out the short pulse heating treatment for 1 second and the print scan for 1 second.

In this case, in light of the entire page, a beginning portion of the page is categorized into a region where the short pulse heating treatment for 4 seconds and the print scan for 1 second are alternately carried out. On the other hand, a subsequent portion of the page is categorized into a region where the short pulse heating treatment for 1 second and the print scan for 1 second are alternately carried out. Accordingly, in the case where the print medium is the glossy paper, the degrees of roughness formed on the surface of the print medium vary between the beginning portion and the subsequent portion thereof, and the differences in glossiness and chromogenic property are prone to be developed. However, in the case where the print medium is the plain paper or the coated paper having an excellent ink absorbing property, the roughness is less likely to be formed on the surface of the print medium and the differences in glossiness and chromogenic property are not caused by the variation in standby time period. As a consequence, in this embodiment, the above-described first printing mode is prepared as the printing mode for printing the image on the plain paper or the coated paper by using the matte BK ink.

On the other hand, in a second printing mode (FIG. 11B) in which the second target temperature T2 is set equal to 20° C., the temperature of the print head 102 is in the state of being sufficiently higher than the second target temperature T2 at the timing to start the second print scan. Accordingly, the second short pulse heating treatment is not carried out before the second print scan. Instead, the second print scan is carried out immediately after the first print scan. Then, the print scans not following the short pulse heating treatment as mentioned above are continuously carried out for some time. Hence, the temperature of the print head 102 gradually drops and a temperature below the second target temperature T2 is eventually detected at a certain print scan after several times. FIG. 11B shows the case where the temperature below the second target temperature T2 is detected at the timing of the fifth print scan.

The second short pulse heating treatment (S910) is carried out at the timing of detection of the temperature below the second target temperature T2. Nonetheless, since the second target temperature T2 (20° C.) in the second printing mode is set to a substantially low temperature, the time period (1 second) required for the second short pulse heating treatment is substantially shorter than the time period (4 seconds) in the first printing mode. Thereafter, the short pulse heating treatment for 1 second and the print scan for 1 second will be alternately repeated in the second printing mode.

Even if the print scans are repeated afterwards, the temperature of the entire print head 102 does not significantly vary whereby the temperature around 20° C. is maintained while the surrounding environmental temperature is 15° C. Accordingly, the amount of drop in temperature of the print head in each print scan is small and the time period required for each short pulse heating treatment is also maintained at about 1 second.

Specifically, in the second printing mode shown in FIG. 11B, the short pulse heating treatment for 0 second and the print scan for 1 second are alternately carried out for the four print scans in the beginning, and the short pulse heating treatment for 1 second and the print scan for 1 second are alternately carried out from the fifth print scan on. In this case, in light of the entire page, there is a difference in elapsed time equivalent to about 1 second between the respective print scans in the beginning region and the remaining region. However, such a small difference does not cause a significant change in the state of roughness, and unevenness in glossiness or chromogenic property is not recognized.

Meanwhile, the above-described example shows the case where the driving frequency of the print head is constant. In reality, however, the amount of drop in temperature of the print head and the time period required for the second short pulse heating treatment vary among the respective print scans. Nonetheless, by setting the second target temperature T2 to a substantially low value as in this embodiment, the amounts of change in the detected temperature and in the time period required for the second short pulse heating treatment can be retained within allowable ranges irrespective of the elapsed time from the start of the printing. As a consequence, it is possible to suppress the roughness of the entire image on the surface of the print medium in the case of the glossy paper, and to make the image unevenness attributed to the differences in glossiness and chromogenic property between the unit regions unnoticeable on the page as a whole. Due to the reasons mentioned above, in this embodiment, the above-described second printing mode is prepared as the printing mode for printing the image on the glossy paper by using the photo BK ink.

As discussed above, in the first printing mode of this embodiment, the image having the high density and being excellent in sharpness can be printed on the plain paper or the coated paper by conducting the multipass printing with the matte BK ink. On the other hand, in the second printing mode, the uniform image excellent in gradation and glossiness can be printed on the glossy paper by conducting the multipass printing with the photo BK ink.

Second Embodiment

The inkjet printing apparatus described with reference to FIGS. 1 to 6 will also be used in this embodiment.

Figure 12:
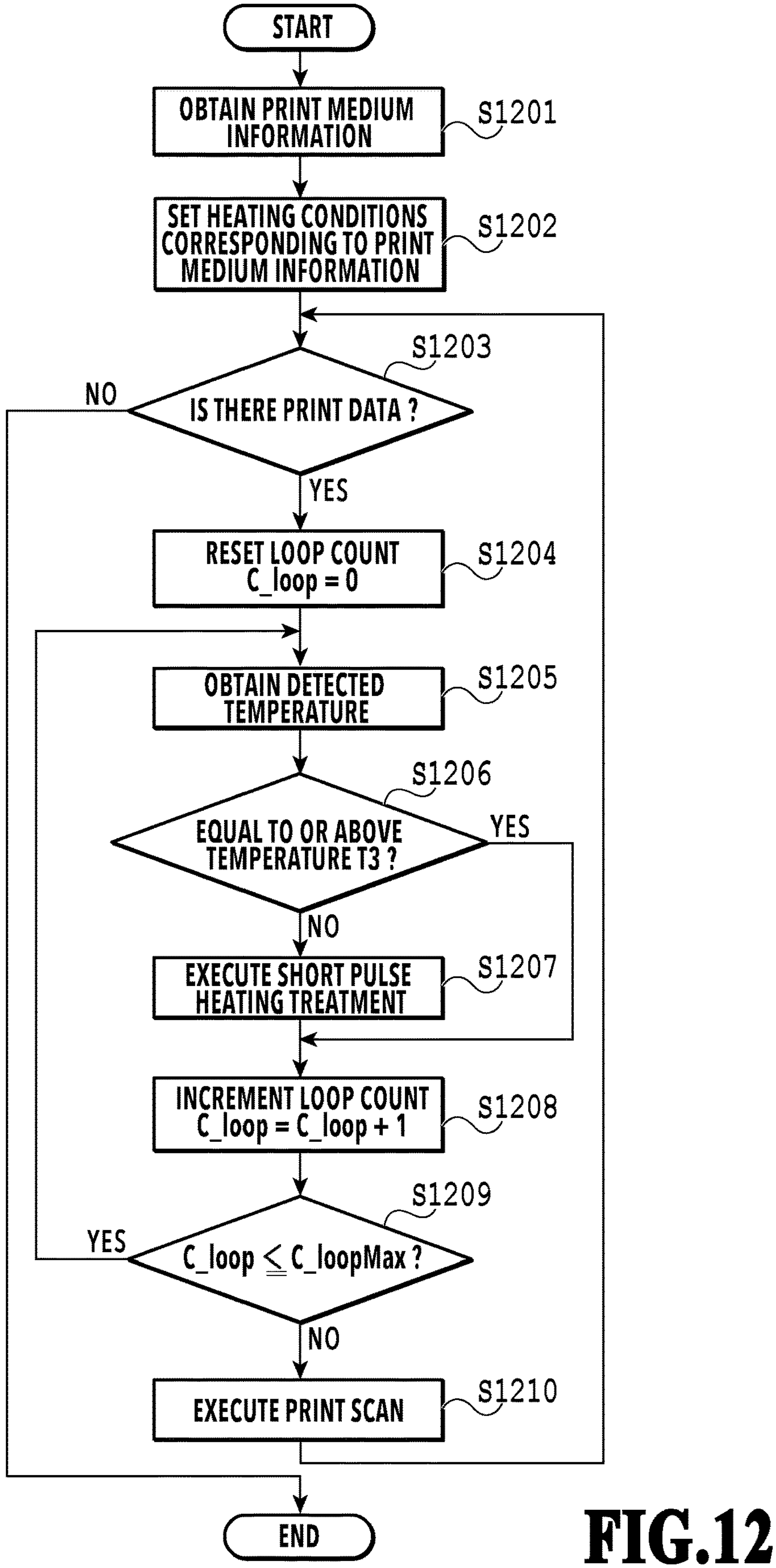
FIG. 12 is a flowchart for explaining a print control method of a second embodiment.

FIG. 12 is a flowchart for explaining the print control of this second embodiment. This processing is processing to be executed by the MPU 201 of FIG. 2 in accordance with the program stored in the ROM 202 while using the DRAM 203 as the work area in the case where the print job is inputted to the printing apparatus 100.

At the start of the processing, the MPU 201 first analyzes the print job and obtains the type of the print medium P in S1201. In S1202, the MPU 201 sets heating conditions based on the type of the print medium obtained in S1201.

FIG. 13 is a table showing the heating conditions to be obtained in S1201, which are associated with the types of the print medium and the types of the ink. A target temperature T3 of the short pulse heating treatment; the pulse width Ph, the pulse voltage Vh, the pulse application cycle T, and the number of times of application Nh of the temperature adjustment pulse P2; and a repetition upper limit value (C_loopMax) of the short pulse heating treatment are set as the heating conditions for each type of the print medium. In this embodiment, the target temperature T3 is set to 25° C. for all the print media. Meanwhile, the pulse width Ph, the pulse voltage Vh, the pulse application cycle T, and the number of times of application Nh of the temperature adjustment pulse P2 are set to the same values for all the print media, respectively. Only the repetition upper limit value (C_loopMax) is made variable and a value "6" is set to the plain paper or the coated paper while a value "1" is set to the glossy paper. Information on the above-mentioned heating conditions is saved in the ROM 202 (see FIG. 2) in advance.

Back to the flowchart of FIG. 12, in S1203, the MPU 201 determines whether or not there is the print data for the next print scan. In a case where there is the print data for the next print scan, the MPU 201 proceeds to S1204 and resets the loop count C_loop (C_loop=0).

In S1205, the MPU 201 obtains the detected temperature by the temperature sensor 53. In S1206, the MPU 201 determines whether or not the detected temperature is equal to or above the target temperature T3 among the heating conditions set in S1202. In the case where the detected temperature is below the target temperature T3, the MPU 201 proceeds to S1207 and executes the short pulse heating treatment in accordance with the heating conditions set in S1202. Specifically, the MPU 201 drives each of the heaters 52 in accordance with the pulse width Ph, the pulse voltage Vh, the pulse cycle T, and the number of times of application Nh. On the other hand, in the case where the detected temperature is equal to or above the target temperature T3, the MPU 201 proceeds to S1208 while skipping the S1207.

In S1208, the MPU 201 increments the loop count C_loop (C_loop=C_loop+1). Then, in S1209, the MPU 201 determines whether or not the loop count C_loop is larger than the repetition upper limit value (C_loopMax) set in S1202. The MPU 201 returns to S1205 in the case where the loop count C_loop is equal to or below the repetition upper limit value C_loopMax.

The above-mentioned processing from S1205 to S1209 is repeated until the loop count C_loop is determined to be larger than the repetition upper limit value (C_loopMax) in S1209. In the case where the loop count C_loop is determined to be larger than the repetition upper limit value (C_loopMax) in S1209, the MPU 201 proceeds to S1210 to execute one print scan, and then returns to S1203.

The MPU 201 repeats the processing from S1203 to S1210 until it is determined that there is no print data left in S1203. Then, the processing is terminated in the case where the MPU 201 determines that there is no print data for the next print scan in S1203.

In the embodiment described above, the loop from S1205 to S1209 is carried out until the loop count C_loop reaches the repetition upper limit value C_loopMax irrespective of whether the short pulse heating treatment in S1207 is executed or not. Specifically, since an initial value of the loop count C_loop is 0, the above-mentioned loop is carried out (C_loopMax+1) times.

Referring to FIG. 13 again, in the case of the plain paper or the coated paper, the repetition upper limit value C_loopMax is equal to 6. Accordingly, the short pulse heating treatment in S1207 of applying the temperature adjustment pulse having the pulse width Ph 5000 times is carried out seven times (=6+1) at the maximum. That is to say, the maximum time required for the short pulse heating treatment in each print scan is calculated as $$T\times Nh\times(C\_\text{loopMax})=100\ \mu\text{s}\times5000\times7=3.5\ \text{seconds.}$$

In other words, the short pulse heating treatment is carried out within a range of limited time of 3.5 seconds in the case of the plain paper or the coated paper.

On the other hand, in the case of the glossy paper, the repetition upper limit value C_loopMax is equal to 1. Accordingly, the short pulse heating treatment in S1207 of applying the temperature adjustment pulse having the pulse width Ph 5000 times is carried out twice (=1+1) at the maximum. That is to say, the maximum time required for the short pulse heating treatment in each print scan is calculated as $$T\times Nh\times(C\_\text{loopMax}+1)=100\ \mu\text{s}\times2=1.0\ \text{second.}$$

In other words, the short pulse heating treatment is carried out within a range of limited time of 1.0 second in the case of the glossy paper.

According to the above-described embodiment, in the case where the print medium is the glossy paper, it is possible to carry out the short pulse heating treatment in each print scan while suppressing the required time therefor to the extent not bringing about the unevenness in the image. As a consequence, the uniform image excellent in gradation and glossiness can be printed on the glossy paper. On the other hand, in the case where the print medium is the plain paper of the coated paper, it is possible to adjust the temperature of the ink more appropriately by the short pulse heating treatment in each print scan. As a consequence, the image having the high density and being excellent in sharpness can be printed on the plain paper or the coated paper.

Note that in this embodiment, the repetition upper limit values C_loopMax are not limited to the values shown in FIG. 13. The repetition upper limit value C_loopMax may be set to an appropriate value based on the type of the print medium or the type of the ink so as to enable the print head to perform the stable ejection operation within the range that makes the image unevenness unnoticeable.

Meanwhile, as with the target temperatures in the first embodiment, the repetition upper limit values C_loopMax may be set to different values between the first short pulse heating treatment to be carried out before the first print scan and the second short pulse heating treatment to be carried out at the second and later print scans. By setting the repetition upper limit value C_loopMax in the first short pulse heating treatment to a large value and starting the first print scan after sufficiently heating the print head 102, it is possible to reduce the required time for the second short pulse heating treatment in the second and later print scans.

Incidentally, in the case of the second embodiment, after the short pulse heating treatment is carried out (C_loopMax+1) times, the print scan is carried out even if the detected temperature is below the target temperature. As a consequence, the state of ejection may be unstable in the above-described print scan. In this case, the temperature adjustment pulse may be switched to a different temperature adjustment pulse having a higher heating effect starting the next short pulse heating treatment. Specifically, in the case where the print head is not successfully heated to the target temperature in the short pulse heating treatment for the N-th (N is an integer equal to or above 2) print scan, the temperature adjustment pulse capable of applying larger thermal energy may be used in the short pulse heating treatment for the N+1-th print scan.

FIG. 14 shows examples of two types of the temperature adjustment pulses prepared for the glossy paper. The upper stage shows the temperature adjustment pulse to be used in the ordinary short pulse heating treatment. The lower stage shows the temperature adjustment pulse to be used in the short pulse heating treatment after carrying out the print scan in the state where the detected temperature is lower than the target temperature. The pulse width Ph at the lower stage is larger than the pulse width Ph at the upper stage. By setting the pulse width Ph of the temperature adjustment pulse large within the above-mentioned range not exceeding the pulse width Pth at the lower limit value described above, it is possible to increase the thermal energy to be applied to the ink, thus further increasing heating efficiency under the same driving cycle. A method of increasing the pulse voltage Vh and a method of increasing the driving frequency are also effective as the method of increasing the thermal energy to be applied to the ink.

Third Embodiment

The inkjet printing apparatus described with reference to FIGS. 1 to 6 will also be used in this embodiment.

Figure 15:
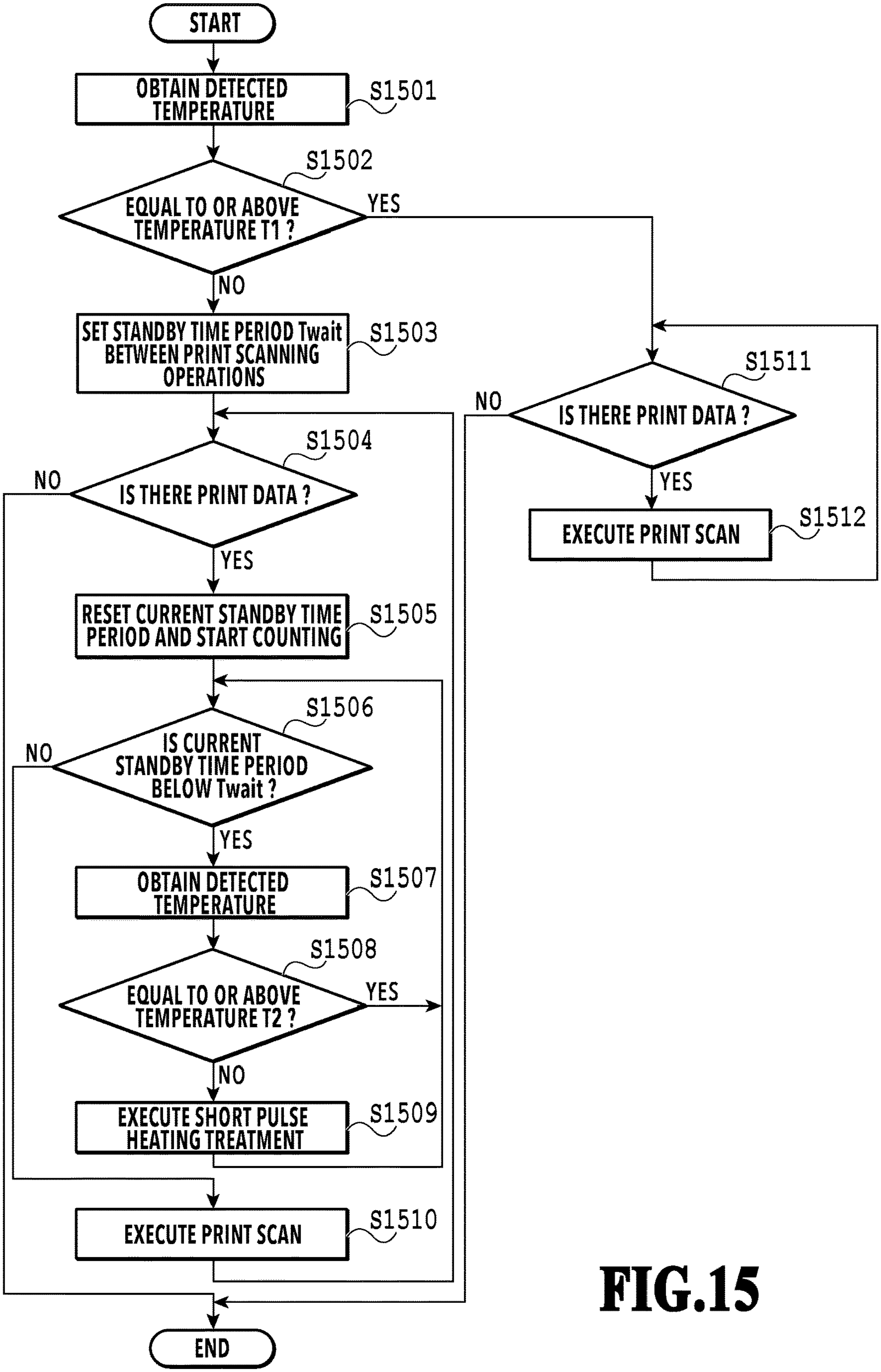
FIG. 15 a flowchart for explaining a print control method of a third embodiment.

FIG. 15 is a flowchart for explaining the print control in the case of printing on the glossy paper in this embodiment. This processing is processing to be executed by the MPU 201 of FIG. 2 in accordance with the program stored in the ROM 202 while using the DRAM 203 as the work area in the case where the print job is inputted to the printing apparatus 100.

At the start of the processing, the MPU 201 first obtains the detected temperature by the temperature sensor 53 in S1501. In S1502, the MPU 201 determines whether or not the detected temperature is equal to or above the predetermined first target temperature T1. In this embodiment, the first target temperature is set to a satisfactory temperature which is high enough for not requiring the short pulse heating treatment in the subsequence print scans. The MPU 201 proceeds to S1511 in the case where the detected temperature is equal to or above the first target temperature T1.

In S1511, the MPU 201 determines whether or not there is the print data for the next print scan. In the case where there is the print data for the next print scan, the MPU 201 executes one print scan in S1512 and then returns to S1511. The MPU 201 repeats the processing from S1511 to S1512 until it is determined that there is no print data left in S1511. Then, the processing is terminated in the case where the MPU 201 determines that there is no print data for the next print scan.

On the other hand, the MPU 201 proceeds to S1503 in the case where the detected temperature is determined to be below the first target temperature T1 in S1502.

In S1503, the MPU 201 set a standby time period Twait. Here, the standby time period Twait is a fixed time period determined as the time required for the short pulse heating treatment.

In S1504, the MPU 201 determines whether or not there is the print data for the next print scan. In the case where there is the print data for the next print scan, the MPU 201 proceeds to S1505 to reset a standby time period counter (Cw=0), and further starts counting.

In S1506, the MPU 201 determines whether or not a counted value Cw at the present time point is below the standby time period Twait set in S1503. In the case where the counted value Cw is below the standby time period Twait, the MPU 201 proceeds to S1507 and obtains the detected temperature by the temperature sensor 53.

In S1508, the MPU 201 determines whether or not the detected temperature is equal to or above the preset second target temperature T2. In the case where the detected temperature is below the second target temperature T2, the MPU 201 proceeds to S1509 to execute the predetermined short pulse heating treatment, and then returns to S1506. On the other hand, in the case where the detected temperature is determined to be equal to or above the preset second target temperature T2 in S1508, the MPU 201 returns to S1506 while skipping the short pulse heating treatment in S1509.

The above-described processing from S1506 to 1509 is repeated until the counted value Cw at the present time point is determined to be equal to or above the standby time period Twait in S1506. In the case where the counted value Cw at the present time point is determined to be equal to or above the standby time period Twait in S1506, the MPU 201 proceeds to S1510 to execute one print scan, and then returns to S1504.

The MPU 201 repeats the processing from S1504 to S1510 until it is determined that there is no print data left in S1504. Then, the processing is terminated in the case where the MPU 201 determines that there is no print data for the next print scan.

According to the print control of the above-described embodiment, all the print scans are executed without interposing the short pulse heating treatment in the case where the detected temperature at the time point of input of the print job is equal to or above the first target temperature T1. On the other hand, in the case where the detected temperature at the time point of input of the print job is below the first target temperature T1, the short pulse heating treatment is executed in the predetermined standby time period Twait. As described above, according to the print control of this embodiment, all the print scans can be carried out in the state of maintaining the elapsed time between every two print scans at the constant value even in the case where the detected temperature at the time point of input of the print job is equal to or above the first target temperature T1 or below the first target temperature T1. As a consequence, the uniform image excellent in gradation and glossiness can be printed on the glossy paper.

Note that the first target temperature T1 and the second target temperature T2 can be set appropriately in this embodiment. The second target temperature T2 is preferably set to a temperature necessary for allowing the print head to carry out the stable ejection operation. The first target temperature T1 is preferably set to a temperature sufficiently higher than the second target temperature T2 so as not to require the short pulse heating treatment in the print scans thereafter.

Meanwhile, the standby time period Twait is required to be a large value enough for obtaining the sufficient effect of the short pulse heating treatment. However, setting a too large value for the standby time period Twait may result in unnecessarily long time for print processing, which will lead to deterioration in throughput. From this point of view, the standby time period Twait is preferably set equivalent to or below the time required for reaching the second target temperature T2 in the first short pulse heating treatment after receiving the print job.

Other Embodiments

The above-described embodiments have explained the case of setting parameters necessary for the print control, such as the target temperatures, the heating conditions, and the standby time period depending on the type of the print medium. Instead, these parameters may be set depending on the type of the ink used. Alternatively, the parameters may be set based on a combination of the print medium and the ink.

Meanwhile, the description has been given of the print control premised on the case of carrying out the multiplass printing. However, there is also a case where the present invention can exert effects even in the case of not carrying out the multiplass printing. There may be a case of one-pass printing where a difference in glossiness associated with the above-described roughness may be developed at a boundary portion between bands printed in individual print scans, and such a difference may be recognized as a joining stripe. By adopting the above-described print control method, it is possible to reduce the difference in glossiness and to make the joining stripe unnoticeable.

Parts of the configurations of the above-described first to third embodiments may be introduced together to another configuration. For example, in the case where the detected temperature at the time point of input of the print job reaches a satisfactory temperature that is high enough in the first embodiment, all the print scans may be carried out without interposing the short pulse heating treatment as described in the third embodiment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-056273 filed Mar. 26, 2020, which is hereby incorporated by reference wherein in its entirety.

What is claimed is:

1. An inkjet printing apparatus comprising:

a print scanning unit configured to carry out a print scan on a print medium by causing a print head that ejects an ink in accordance with print data to scan in a main scanning direction;

a conveying unit configured to perform conveyance of the print medium in a direction crossing the main scanning direction;

a heating unit configured to heat the print head before carrying out each of the print scans; and a controlling unit configured to control the print scanning unit, the conveying unit, and the heating unit, wherein the first print scan in a first print job for a first type of print medium is carried out in a case where a temperature of the print head is higher than a first target temperature, wherein each of the second and later print scans in the first print job is carried out in a case where a temperature of the print head is higher than a second target temperature, wherein the first print scan in a second print job for a second type of print medium different from the first type of print medium is carried out in a case where a temperature of the print head is higher than the first target temperature, and wherein each of the second and later print scans in the second print job is carried out in a case where a temperature of the print head is higher than a third target temperature different from the second target temperature.

2. The inkjet printing apparatus according to claim 1, wherein the third target temperature is lower than the first target temperature.

3. The inkjet printing apparatus according to claim 1, wherein the second target temperature is equal to the first target temperature.

4. The inkjet printing apparatus according to claim 1, wherein the second type of print medium is glossy paper.

5. The inkjet printing apparatus according to claim 1, wherein an ink absorption property of the first type of print medium is lower than an ink absorption property of the second type of print medium.

6. The inkjet printing apparatus according to claim 1, wherein the first print scan in the first print job is carried out in the case where a temperature of the print head is higher than the first target temperature while a surrounding environmental temperature is 15° C., wherein each of the second and later print scans in the first print job is carried out in the case where a temperature of the print head is higher than a second target temperature while the surrounding environmental temperature is 15° C., wherein the first print scan in the second print job is carried out in the case where a temperature of the print head is higher than the first target temperature while the surrounding environmental temperature is 15° C., and wherein each of the second and later print scans in the second print job is carried out in a case where a temperature of the print head is higher than the third target temperature while the surrounding environmental temperature is 15° C.

7. The inkjet printing apparatus according to claim 1, wherein the first type of print medium is any of plain paper and coated paper.

8. The inkjet printing apparatus according to claim 1, wherein the print head is an inkjet print head configured to eject the ink by applying a first voltage pulse to an energy generation element, and wherein the controlling unit heats the print head by applying a second voltage pulse having any of a pulse width and a pulse voltage smaller than a pulse width and a pulse voltage of the first voltage pulse to the energy generation element as the heating unit.

9. The inkjet printing apparatus according to claim 1, wherein the controlling unit causes the heating unit to heat the print head in a state where the print head is stopped.

10. The inkjet printing apparatus according to claim 1, wherein a matte black ink is used for the printing to the first type of print medium, and wherein a photo black ink is used for the printing to the second type of print medium.

11. An inkjet printing method for printing an image on a print medium, the inkjet printing method comprising:

carrying out a print scan by causing a print head that ejects an ink onto the print medium in accordance with print data to scan in a main scanning direction;

conveying the print medium in a direction crossing the main scanning direction; and heating the print head before carrying out each of the print scans, wherein the first print scan in a first print job for a first type of print medium is carried out in a case where a temperature of the print head is higher than a first target temperature, wherein each of the second and later print scans in the first print job is carried out in a case where a temperature of the print head is higher than a second target temperature, wherein the first print scan in a second print job for a second type of print medium different from the first type of print medium is carried out in a case where a temperature of the print head is higher than the first target temperature, and wherein each of the second and later print scans in the second print job is carried out in a case where a temperature of the print head is higher than a third target temperature different from the second target temperature.

12. The inkjet printing method according to claim 11 wherein the first type of print medium is any of plain paper and coated paper.

13. The inkjet printing method according to claim 11, wherein the second type of print medium is glossy paper.

14. The inkjet printing method according to claim 11, wherein the print head is an inkjet print head configured to eject the ink by applying a first voltage pulse to an energy generation element, and wherein the print head is heated by applying a second voltage pulse having any of a pulse width and a pulse voltage smaller than a pulse width and a pulse voltage of the first voltage pulse to the energy generation element.

15. The inkjet printing method according to claim 11, wherein the print head is heated in a state where the print head is stopped.

16. The inkjet printing method according to claim 11, wherein the third target temperature is lower than the first target temperature.

17. The inkjet printing method according to claim 11, wherein the second target temperature is equal to the first target temperature.

18. The inkjet printing method according to claim 11, wherein an ink absorption property of the first type of print medium is lower than an ink absorption property of the second type of print medium.

* * * * *